(12) United States Patent
Ando et al.

(10) Patent No.: US 8,141,880 B2
(45) Date of Patent: Mar. 27, 2012

(54) HIGH PRESSURE SEALING APPARATUS

(76) Inventors: Shigeo Ando, Chiba (JP); Masao Ando, Chiba (JP); Toyoroku Ando, Chiba (JP)

( * ) Notice: Subject to any disclaimer, the term of this patent is extended or adjusted under 35 U.S.C. 154(b) by 284 days.

(21) Appl. No.: 11/948,283

(22) Filed: Nov. 30, 2007

(65) Prior Publication Data

US 2008/0136118 A1  Jun. 12, 2008

(30) Foreign Application Priority Data

Dec. 6, 2006 (JP) .................. 2006-329485
Jul. 3, 2007 (JP) .................. 2007-175220

(51) Int. Cl.
*E21B 33/128* (2006.01)

(52) U.S. Cl. ...................... 277/342; 277/530

(58) Field of Classification Search .......... 277/529, 277/530, 531

See application file for complete search history.

(56) References Cited

U.S. PATENT DOCUMENTS

| | | | | |
|---|---|---|---|---|
| 2,417,840 A | * | 3/1947 | Rodgers al. ............ | 277/530 |
| 2,442,687 A | * | 6/1948 | Heathcott ............ | 277/530 |
| 3,467,394 A | * | 9/1969 | Bryant ............ | 277/308 |
| 3,790,179 A | * | 2/1974 | Scannell ............ | 277/558 |
| 4,214,761 A | * | 7/1980 | Pippert ............ | 277/530 |
| 4,572,519 A | | 2/1986 | Cameron et al. | |
| 5,577,737 A | | 11/1996 | Lacy | |
| 7,401,788 B2 | * | 7/2008 | Williams et al. ........ | 277/342 |

* cited by examiner

*Primary Examiner* — Shane Bomar
*Assistant Examiner* — Kipp Wallace
(74) *Attorney, Agent, or Firm* — Reising Ethington P.C.

(57) ABSTRACT

There is provided a high pressure sealing apparatus including: a top adapter including a packing receiving recess having an inverted V-shaped section; a bottom adapter including a packing supporting wall having an inverted V-shaped section; packing members each having an inverted V-shaped section, and interposed between the top adapter and the bottom adapter; and backup rings each having an inverted V-shaped section, and alternately overlapped with the packing members. The packing members are made of hard synthetic resin. A deformation allowing gap is formed on at least two facing walls of a top wall or a bottom wall of the packing member, and a bottom wall of the top adapter, a top wall and a bottom wall of the backup ring, or a top wall of the bottom adapter to be closed owing to compaction force in an axial direction X.

9 Claims, 13 Drawing Sheets

HIGH PRESSURE SEALING APPARATUS

CROSS REFERENCE TO RELATED APPLICATIONS

This application claims priority to Japanese Patent Application No. 2006-329485 filed Dec. 6, 2006 and Japanese Patent Application No. 2007-175220 filed Jul. 3, 2007, the contents of both of which are hereby incorporated by reference.

BACKGROUND OF THE INVENTION

1. Field of the Invention

The present invention relates to a high pressure sealing apparatus, for example, a high pressure homogenizer for processing and segmentalizing material by dispersing, emulsifying or crushing the material included in a suspension liquid under high pressure, or for another example, a high-pressure pump for preventing excessive deformation of a packing member against a sliding rod or a sliding piston, and having good following ability and good sealing ability under high-pressure by closely contacting the rod or the piston with a proper contacting force, further, having good abrasion durability with a small degradation, and exerting high strength and high heat resisting property.

2. Description of the Related Art

Conventionally, for example, there is a packing assembly used for a machine such as a pump having a sliding plunger and a plunger bore receiving the plunger. This packing assembly is made by alternately stacking supple rings made of nitrile rubber and rigid rings made of fluorine resin having V-shaped sections interposed between upper and lower hard packing rings (for example, U.S. Pat. No. 5,577,737).

Further, there is another conventional packing assembly including: a packing gland nut threaded into a rear end of a plunger bore; a packing gland spacer abutting on the packing gland nut; a lubrication gland abutting on the packing gland spacer; a unitary stack of packing rings, each of which front face has a concave shape, and which rear face has a convex shape; a female adapter ring interposed between the lubrication gland and the packing rings, said female adapter ring of which concave front surface corresponding to the convex rear face of the packing rings abuts on the packing rings; and a male adapter ring positioned in front of the first packing ring in the stack, said male adapter ring of which convex rear face corresponding to the concave front face of the packing rings abuts on the packing rings (for example, U.S. Pat. No. 4,572,519).

However, the conventional packing assembly described in U.S. Pat. No. 5,577,737 slidably supports the plunger in the plunger bore by having a structure composed of alternately stacking supple rings made of nitrile rubber and rigid rings made of fluorine resin having V-shaped sections interposed between upper and lower hard packing rings. Therefore, when the plunger reciprocatingly slides under high-pressure, the supple ring is excessively resiliently deformed owing to its suppleness, and close contact ability to the plunger is increased. However, when an operating speed of the plunger or the rod is increased, or an inner pressure in the plunger bore is increased, or the plunger is heated, the suppleness and the strength of the supple ring is rapidly deteriorated, and the close contact ability and the sealing ability is reduced so that a leak is occurred.

Further, according to the conventional packing assembly described in U.S. Pat. No. 5,577,737, when the metallic plunger slides, abrasive resistance of the supple ring made of nitrile rubber is reduced, the supple ring is extremely worn and may crack, and a closely contacting position to the plunger is damaged by exceeding the stress limit. Resultingly, a mechanical life of the supple ring is short. Therefore, the supple ring should be frequently replaced with another supple ring. Considerable labor is required for maintenance check.

Thus, when the sealing ability is increased by increasing the suppleness of the supple ring against the metallic plunger to increase the contacting force, the supple ring lacks abrasion durability. Inversely, when the abrasion durability of the supple ring is increased, the suppleness of the supple ring is spoiled, and the sealing ability against the plunger is decreased. Therefore, conventionally, it is very difficult to attain the high-pressure seal having balanced sealing ability and abrasion durability. Basically, the conventional packing assembly described in U.S. Pat. No. 5,577,737 is used in a normal pressure of about 8000 to 12000 PSI and not used in a high pressure under 100 MPa.

Further, according to the conventional packing assembly described in U.S. Pat. No. 4,572,519, a plurality of separated packing rings having substantially V-shaped section are interposed between a female metallic adapter ring of which front face has a concave shape, and a male metallic adaptor ring of which rear face has a convex shape. Therefore, when the plunger reciprocatingly slides under high pressure, the rigidity of the male and female metallic adapter rings and lubricating ability of a lubrication gland are performed. However, similar to U.S. Pat. No. 5,577,737, the abrasion durability of the packing rings against the plunger is not sufficiently improved. Further, the packing ring lacks suppleness and flexibility, and may be deteriorated and cracked. Further, the contact point of the packing ring with the plunger may be damaged by exceeding the stress limit.

In the conventional packing assembly described in U.S. Pat. No. 4,572,519, the degradations of the abrasion durability, flexibility, resilient deformability, and strength of the packing ring are also occurred when the running speed of the plunger is increased, an inner pressure of the plunger bore is increased, or the temperature of the plunger is increased. Thus, the sealing ability of the packing assembly is not sufficient, a leak may occur, and a mechanical life time is short. The packing ring should be frequently replaced with another packing ring. Considerable labor is required for maintenance check.

Further, even in the conventional packing assembly described in U.S. Pat. No. 4,572,519, a plurality of separated packing rings having substantially V-shaped section are interposed between the female metallic adapter ring of which front face has the concave shape, and the male metallic adaptor ring of which rear face has the convex shape, as above described. Further, a packing gland threaded into an end of the plunger bore, a packing gland spacer fitting against the packing gland, and a lubrication ring abutting on the packing gland spacer are provided in the plunger bore. Therefore, the number of parts is large, and a structure of the packing assembly is complex. Therefore, producing and assembling the packing assembly are not easy, and considerable labor is required.

Accordingly, an object of at least certain implementations of the present invention is to provide a high pressure sealing apparatus having a good following ability by preventing excessive deformation of a packing member against a sliding rod or a sliding piston, a good sealing ability under high-pressure by closely contacting the rod or the piston with a proper contacting force, and a good abrasion durability with a small degradation, and exerting high strength having a long mechanical life time to ease maintenance check, and high heat resisting property, further, composed of the small number of parts, and having a simple structure to allow easy production and assembly.

SUMMARY OF THE INVENTION

In order to attain the object, according to one implementation of the present invention, there is provided a high pressure sealing apparatus including:

a top adapter having a substantially circular shape in a plan view, and including a packing receiving recess having an inverted V-shaped section at a bottom wall of the top adapter;

a bottom adapter having a substantially circular shape in a plan view, and including a packing supporting wall having an inverted V-shaped section at a top wall of the bottom adapter;

a plurality of packing members each having a substantially circular shape in a plan view and an inverted V-shaped section, and interposed between the top adapter and the bottom adapter; and a plurality of metallic backup rings each having a substantially circular shape in a plan view and an inverted V-shaped section, including a packing receiving part at a bottom wall of the backup ring, and alternately overlapped with the packing members, wherein the packing members are made of hard synthetic resin, and wherein a deformation allowing gap is formed on at least two facing walls of a top wall or a bottom wall of the packing member, and a bottom wall of the top adapter, a top wall and a bottom wall of the backup ring, or a top wall of the bottom adapter to be closed owing to compaction force in an axial direction.

Preferably, when the compaction force is released, the deformation allowing gap is generated and composed of a contacting part formed near a center bisector in a thickness direction of the packing member, and a noncontact part of which noncontact area is increased as the noncontact part is extended from the contacting part. When setting up the sealing apparatus, the deformation allowing gap is deformed to be closed by tightening force of a tightening bolt assembling the top adapter, the packing members, the backup rings, and the bottom adapter, and by compaction force of the plunger or the rod being inserted into the packing members.

Preferably, an inclination angle at the top wall of the packing member is smaller than an inclination angle of the packing receiving recess formed on the bottom wall of the top adapter, and an inclination angle of the packing receiving part formed at the bottom wall of the backup ring. Further, an inclination angle at the bottom wall of the packing member is larger than an inclination angle at the top wall of the backup ring, and an inclination angle at the top wall of the bottom adapter.

Preferably, the deformation allowing gaps formed at both top and bottom walls of the packing member become wider as the walls are extended from the contacting part disposed near the center bisector.

Preferably, the inclination angle at the top wall of the packing member is substantially the same as the inclination angle of the packing receiving recess formed on the bottom wall of the top adapter, and the inclination angle of the packing receiving part formed at the bottom wall of the backup ring. Further, the inclination angle at the bottom wall of the packing member is larger than the inclination angle at the top wall of the backup ring, and the inclination angle at the top wall of the bottom adapter. Further, the deformation allowing gap formed at the bottom wall of the packing member becomes wider as the walls are extended from the contacting part near the center bisector.

Preferably, the inclination angle at the top wall of the packing member is smaller than the inclination angle of the packing receiving recess formed on the bottom wall of the top adapter, and the inclination angle of the packing receiving part formed at the bottom wall of the backup ring. Further, the inclination angle at the bottom wall of the packing member is substantially the same as the inclination angle at the top wall of the backup ring, and the inclination angle at the top wall of the bottom adapter. Further, the deformation allowing gap formed at the top wall of the packing member becomes wider as the walls are extended from the contacting part near the center bisector.

Preferably, a lip part having a slope of which sectional area is gradually decreased from the high pressure side to the low pressure side is formed on at least inner side wall of the packing member on which the plunger or the rod closely abuts.

Preferably, the inner and the outer side walls of the packing member are formed in a tapered shape with respect to the center bisector.

Preferably, the packing member is made of any one of polyamide resin, polyether ether ketone resin, polyethylene resin, polystyrene resin, or polyvinyl chloride resin.

Preferably, the packing member endures high pressure more than 100 MPa.

Preferably, any one of the top adapter, the backup ring, or the bottom adapter is made of any one of phosphor bronze, stainless steel, aluminum bronze, nickel silver, or beryllium copper alloy.

Preferably, the contacting parts formed on the bottom wall of the top adapter, the upper wall of the backup ring, and the upper wall of the bottom adapter is formed as center bisector centered arcs each having a desired radius.

Preferably, the noncontact parts formed on the bottom wall of the top adapter, the upper wall of the backup ring, and the upper wall of the bottom adapter are formed having substantially triangular sections line-symmetric with respect to the center bisector.

Preferably, each inclination angle of the top walls of the packing member, the backup ring, and the bottom adapter with respect to the center bisector is 57.5 degrees. Further, each inclination angle of the packing receiving recess formed on the bottom wall of the top adapter and the packing receiving part formed on the bottom wall of the backup ring with respect to the center bisector is 60 degrees.

Preferably, each inclination angle of the top wall and the bottom wall of the packing member, and the packing receiving recess formed on the bottom wall of the top adapter with respect to the center bisector is 60 degrees. Further, each inclination angle of the top walls of the backup ring and the bottom adapter with respect to the center bisector is 57.5 degrees.

As used herein, "preferably" means a feature is desired in at least some implementations, but may not be necessary. These and other objects, features, and advantages of the present invention will become more apparent upon reading of the following detailed description along with the accompanied drawings.

DETAILED DESCRIPTION OF PREFERRED EMBODIMENTS

First Embodiment

Figure 1:
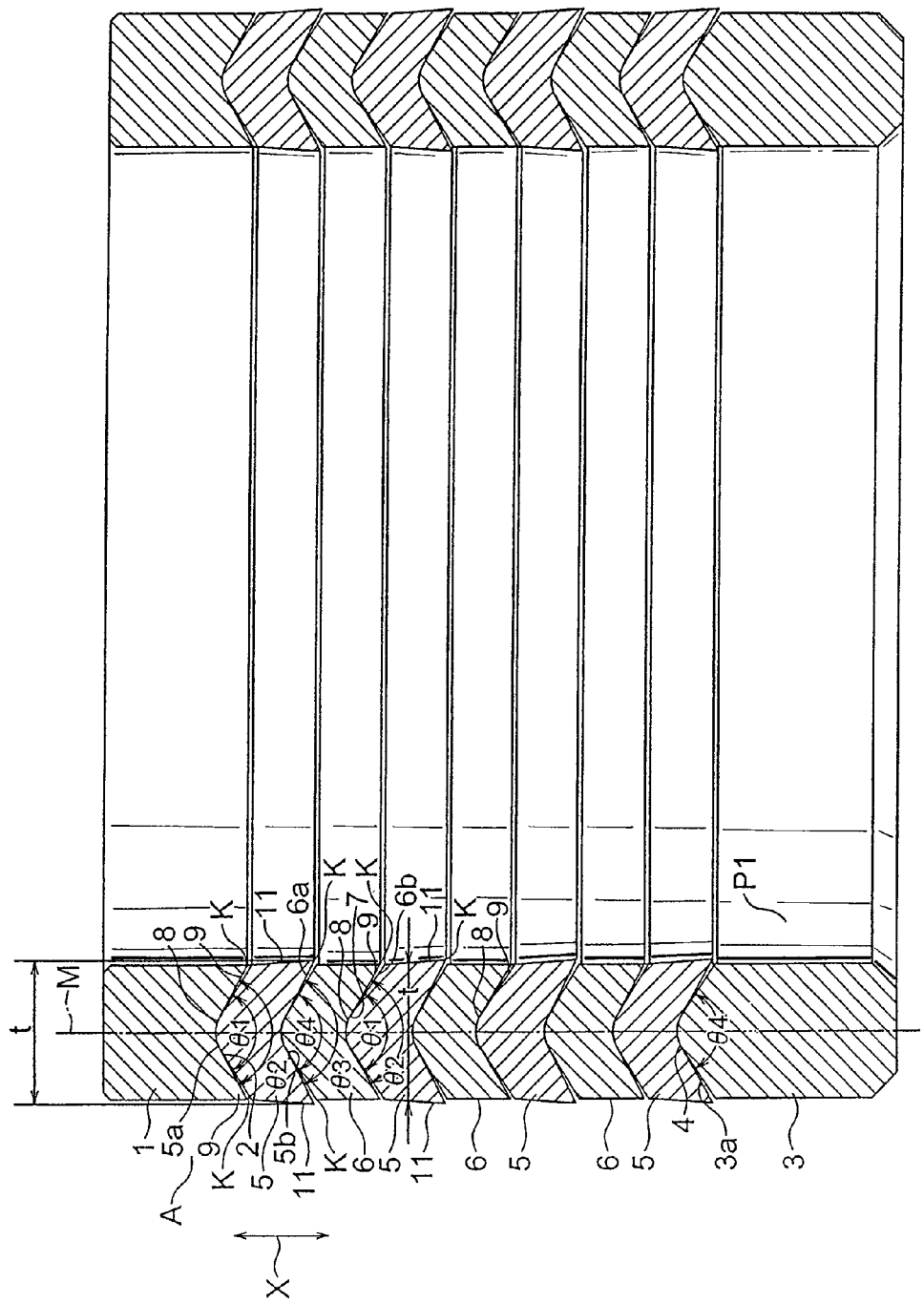
FIG. 1 is a sectional view showing a first embodiment of a high pressure sealing apparatus according to the present invention when compaction force is released.

A first embodiment of a high pressure sealing apparatus according to the present invention will be explained with reference to FIGS. 1 to 5.

As shown in FIGS. 1 to 5, the sealing apparatus according to the first embodiment includes:

a top adapter 1 having a substantially circular shape in a plan view, and including a packing receiving recess 2 having an inverted V-shaped section at a bottom wall of the top adapter 1;

a bottom adapter 3 having a substantially circular shape in a plan view, and including a packing supporting wall 4 having an inverted V-shaped section at a top wall of the bottom adapter 3;

a plurality of packing members 5 each having a substantially circular shape in a plan view and inverted V-shaped section, and interposed between the top adapter 1 and the bottom adapter 3; and a plurality of metallic backup rings 6 each having a substantially circular shape in a plan view and inverted V-shaped section, including a packing receiving part 7 at a bottom wall of the backup ring 6, and alternately overlapped with the packing members 5, wherein the packing members are made of hard synthetic resin, and wherein a deformation allowing gap K is formed for compressionally deforming the packing member 5 in at least two facing walls of a top wall 5a or a bottom wall 5b of the packing member 5, and a bottom wall of the top adapter 1, a top wall 6a and a bottom wall 6b of the backup ring 6, or a top wall 3a of the bottom adapter 3 due to compaction force in an axial direction X.

The packing member 5 is made of any one of polyamide resin, polyether ether ketone resin, polyethylene resin, polystyrene resin, or polyvinyl chloride resin. Preferably, the packing member 5 is made of polyamide resin or polyether ether ketone resin, and formed hard for enduring high pressure. The reason why the packing member 5 is formed hard is for providing good following ability against the plunger or the rod R accompanying with deformation under high pressure. Because the packing member 5 closely abuts on the rod with a proper abutting force, the packing member 5 has good sealing ability to surely prevent leak. Further, the packing member 5 is made of relatively hard synthetic resin so that the packing member 5 may have good abrasion durability with a small degradation, generates little abrasion waste, and may exert high strength and high heat resisting property.

Figure 2:
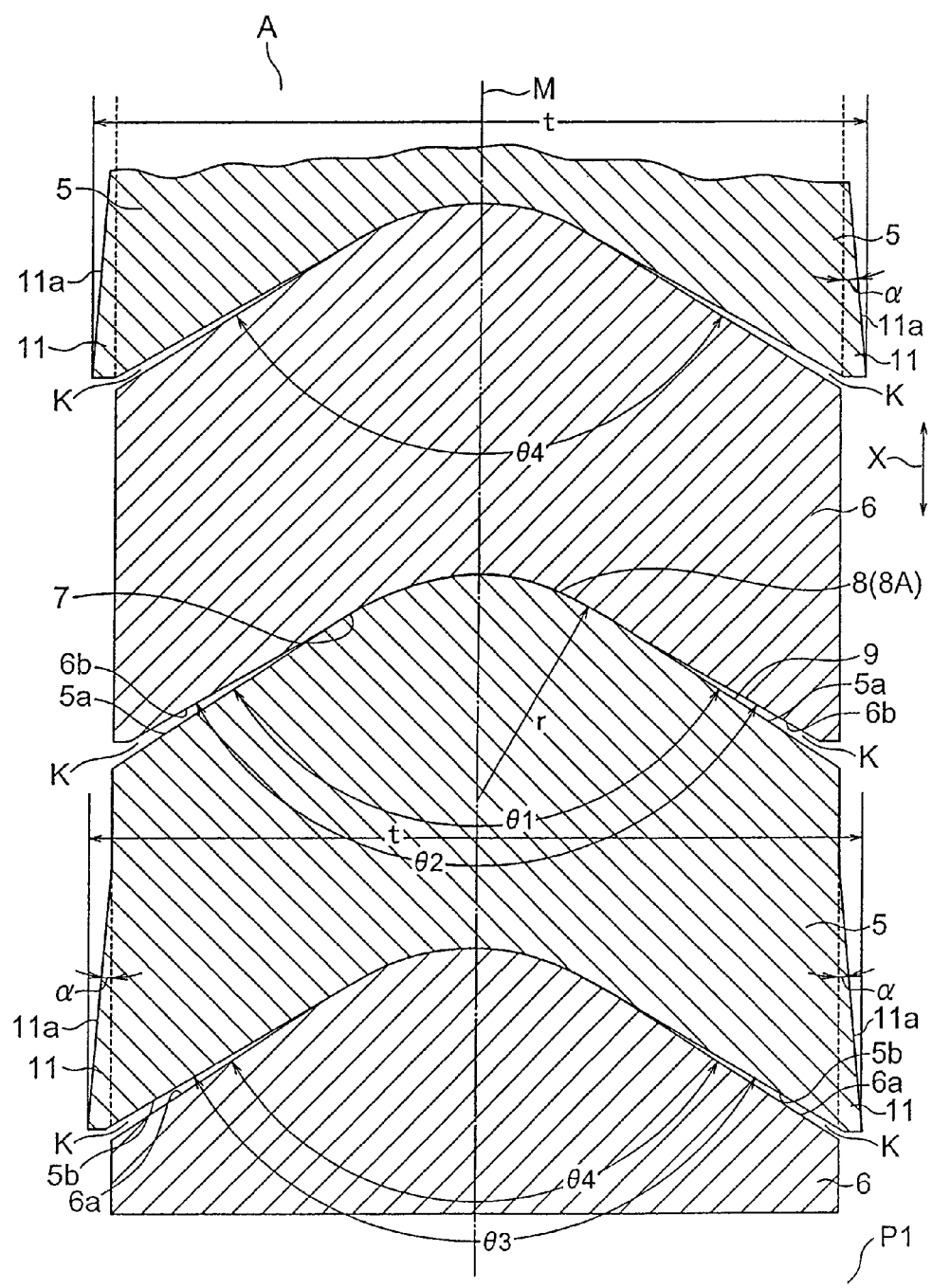
FIG. 2 is an enlarged sectional view showing a part of the high pressure sealing apparatus.
Figure 3:
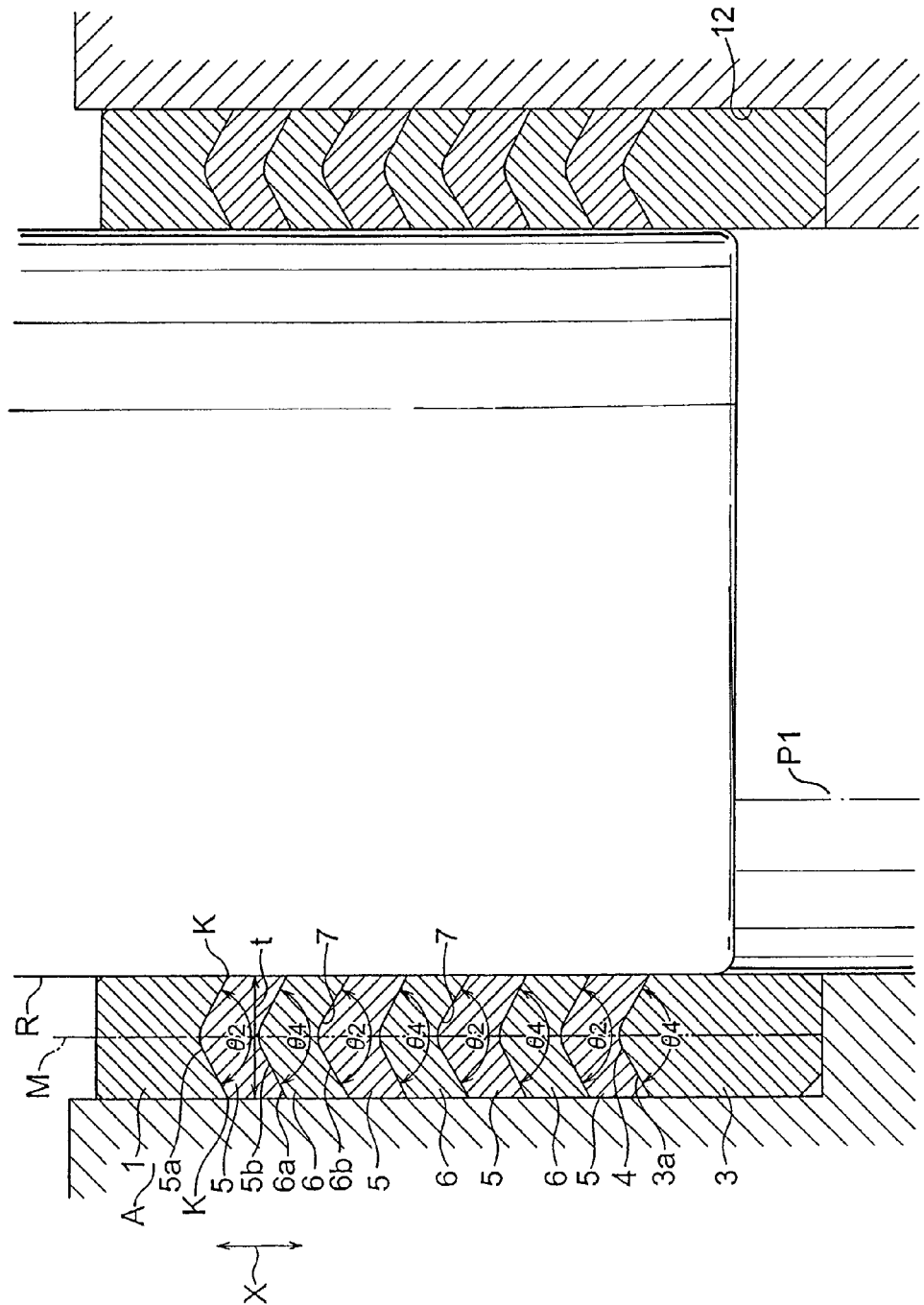
FIG. 3 is a sectional view showing the high pressure sealing apparatus when loading the high pressure sealing apparatus with the compaction force.
Figure 4:
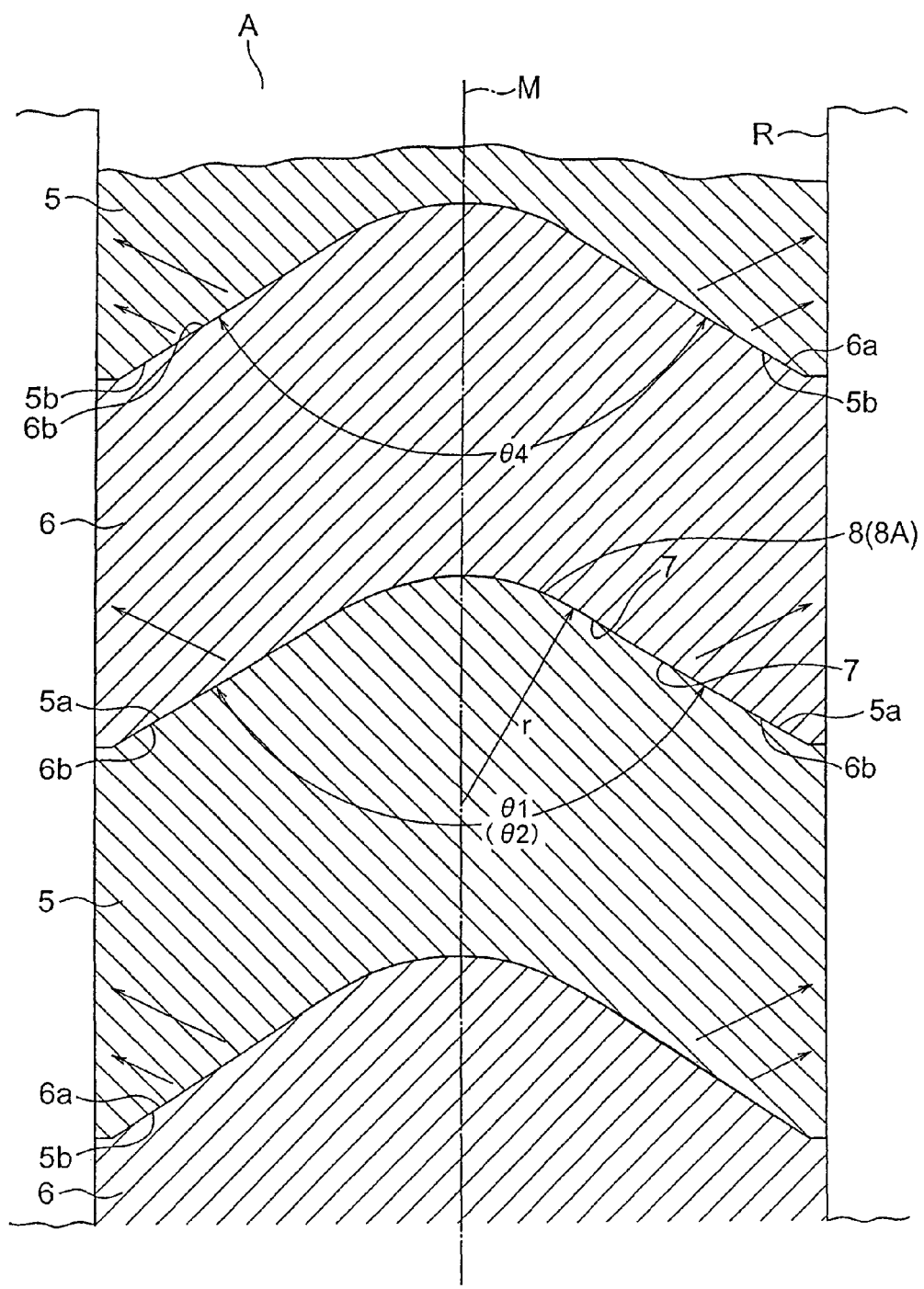
FIG. 4 is an enlarged sectional view showing a part of the high pressure sealing apparatus.

In FIG. 2, when the compaction force is released, the deformation allowing gap K is composed of a contacting part 8 formed near a center bisector M of a thickness t of the packing member 5, and a noncontact part 9 of which noncontact area is increased as the noncontact part 9 is extended from the contacting part 8. When setting up the sealing apparatus, the deformation allowing gap K is narrowed by tightening a tightening bolt 10 assembling the top adapter 1, the packing members 5, the backup rings 6, and the bottom adapter 3. Then, after straightening the whole shape of the packing members 5, the plunger or the rod R is inserted into the packing members 5, so that the packing members 5 are deformed owing to the compaction force in the axial direction X.

Because the contacting part 8 is formed on an arc 8A having a radius r of which center is the center bisector M, the packing member 5 is sandwiched between the bottom wall of the top adapter 1 and the top wall of the backup ring 6. Thus, the sealing apparatus has a good sealing ability under high pressure.

Specifically, according to the first embodiment, in the deformation allowing gap K, an inclination angle θ1 at the top wall of the packing member 5 is smaller than an inclination angle θ2 of the packing receiving recess 2 formed on the bottom wall of the top adapter 1, and an inclination angle θ2 of the packing receiving part 7 formed at the bottom wall 6b of the backup ring 6. Further, an inclination angle θ3 at the bottom wall 5b of the packing member 5 is larger than an inclination angle θ4 at the top wall 6a of the backup ring 6, and the inclination angle θ4 at the top wall of the bottom adapter 3.

More specifically, according to the first embodiment, as shown in FIGS. 1 and 2, each of the inclination angles θ1 and θ4 is 115 degrees. Each of the inclination angles θ2 and θ3 is 120 degrees. However, these inclination angles are not limited to those according to the present invention.

Further, the noncontact part 9 has a substantially triangular section and is line-symmetric with respect to the center bisector M. Accordingly, when the packing members 5 are installed, the deformation allowing gap K is narrowed by tightening the tightening bolt 10. Then, after straightening the packing members 5, the plunger or the rod R is inserted into the packing members 5. Thus, the compaction force in the axial direction X deforms the packing members 5 to close the noncontact part 9. Thus, the plunger or the rod R is prevented from the excessive deformation over the stress limit or the elastic limit, and bilaterally balanced deformation of the packing members 5 are carried out. Therefore, because the packing members 5 receive the dispersed high pressure, the packing members 5 closely contact the plunger or the rod R with the proper contacting force and have good sealing ability. Further, at an inner circumference of the packing member 5, the abrasion of the packing member 5 with respect to the plunger or the rod R is reduced, the abrasion durability of the packing member 5 is increased, the heating of the packing member 5 owing to the abrasion is regulated, and the life time of the packing member 5 is increased.

The packing member 5 according to the first embodiment of course can endure pressure less than 100 MPa, and endure more than 100 MPa to have good sealing ability. Preferably, the packing member 5 endures the pressure over 280 MPa, and has a good sealing ability to surely prevent leak.

A lip part 11 having a slope 11a of which sectional area is gradually decreased from the high pressure side to the low pressure side is formed on at least inner side wall of the packing member 5 on which the plunger or the rod R closely abuts. Owing to the lip part 11, the packing member 5 is prevented from the excessive deformation, has good following ability to the plunger or the rod R reciprocatingly sliding in the axial direction X, and closely contacts the plunger or the rod R with the proper contacting force to have good sealing ability. Further, the abrasion against the plunger or the rod R is decreased to improve the abrasion durability.

Specifically, the slope 11a has an inclination angle α with respect to the center bisector M. In the first embodiment, the inclination angle α is five degree. Corresponding to the hardness level, thickness, height or the like of the packing member 5, the inclination angle α of the slope 11a is changed. Therefore, the sealing ability and the abrasion durability of the packing member 5 against the plunger or the rod R can be properly changed and adjusted.

Further, any one of the top adapter 1, the backup ring 6, or the bottom adapter 3 is made of any one of phosphor bronze (second or third class), stainless steel (SUS329J4L), aluminum bronze (second or third class), nickel silver (second or third class), or beryllium copper alloy. Thus, the mechanical life time of the top adapter 1, the backup ring 6, or the bottom adapter 3 is increased, and heat resistance property, rust preventing ability, and chemical resistance thereof are increased.

For installing the sealing apparatus in a packing receiving recess 12 of a target device B such as a high pressure homogenizer for processing and segmentalizing material, or a high pressure pump, firstly, the top adapter 1 and the bottom adapter 3 are arranged up and down. Then, the packing members 5 and the backup rings 6 are alternately overlapped with each other in between the top adapter 1 and the bottom adapter 3. Then, a cover F covers, and a plurality of tightening bolts 10 are tightened to narrow the deformation allowing gap K and straighten the whole shape of the packing members 5. At this time, the numbers of the packing members 5 and the backup rings 6 are selected corresponding to a normal inner pressure of the target device B.

As shown in FIGS. 1 and 2, when the compaction force is released before the tightening bolts 10 are tightened, the deformation allowing gaps K are formed toward the high pressure side P in between two facing walls of the top walls 5a, the bottom walls 5b of the packing members 5, the bottom wall of the top adapter 1, the top walls 6a and the bottom walls 6b of the backup ring 6, and the top wall of the bottom adapter 3.

Figure 5:
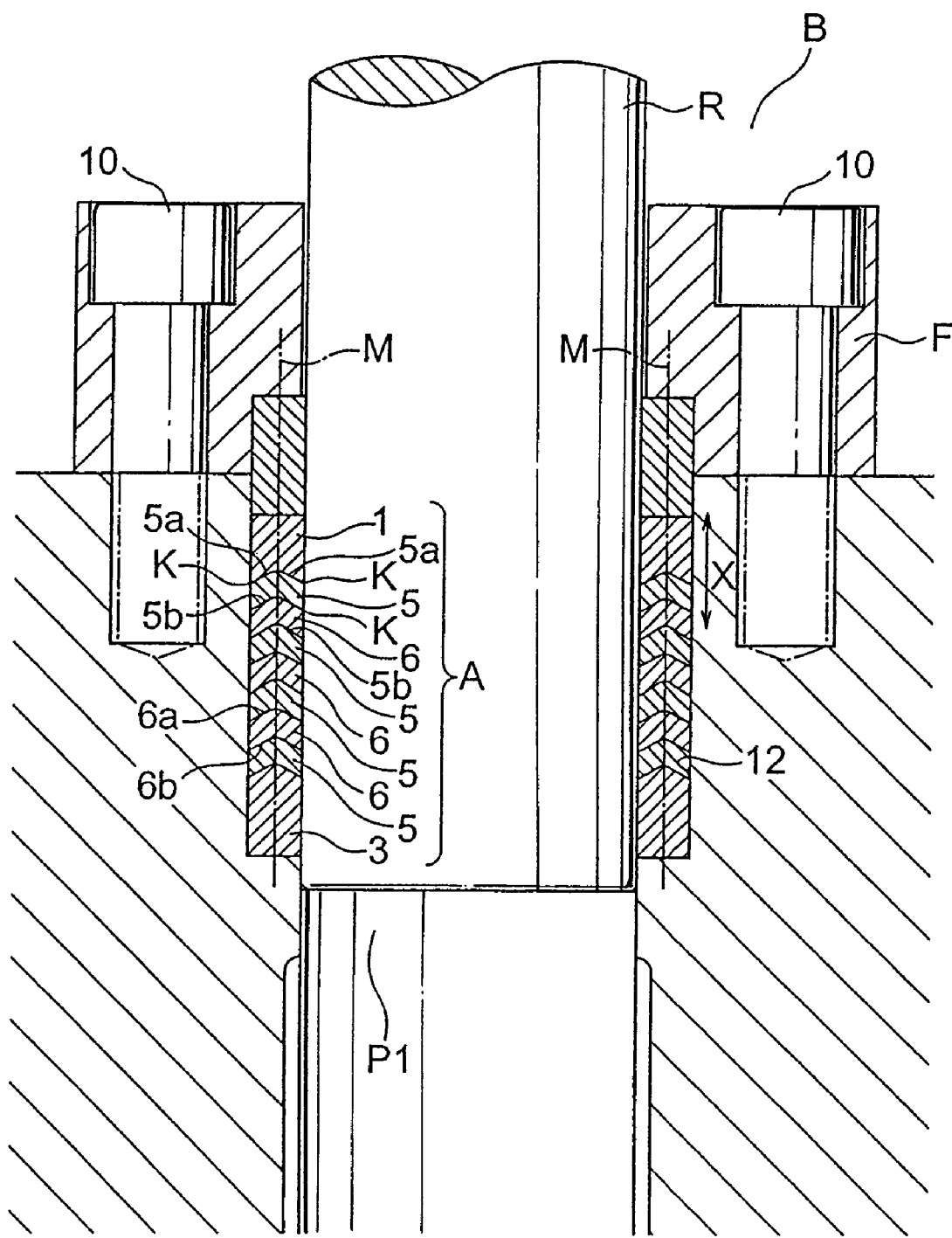
FIG. 5 is a sectional view showing the high pressure sealing apparatus installed into a target device.
Figure 6:
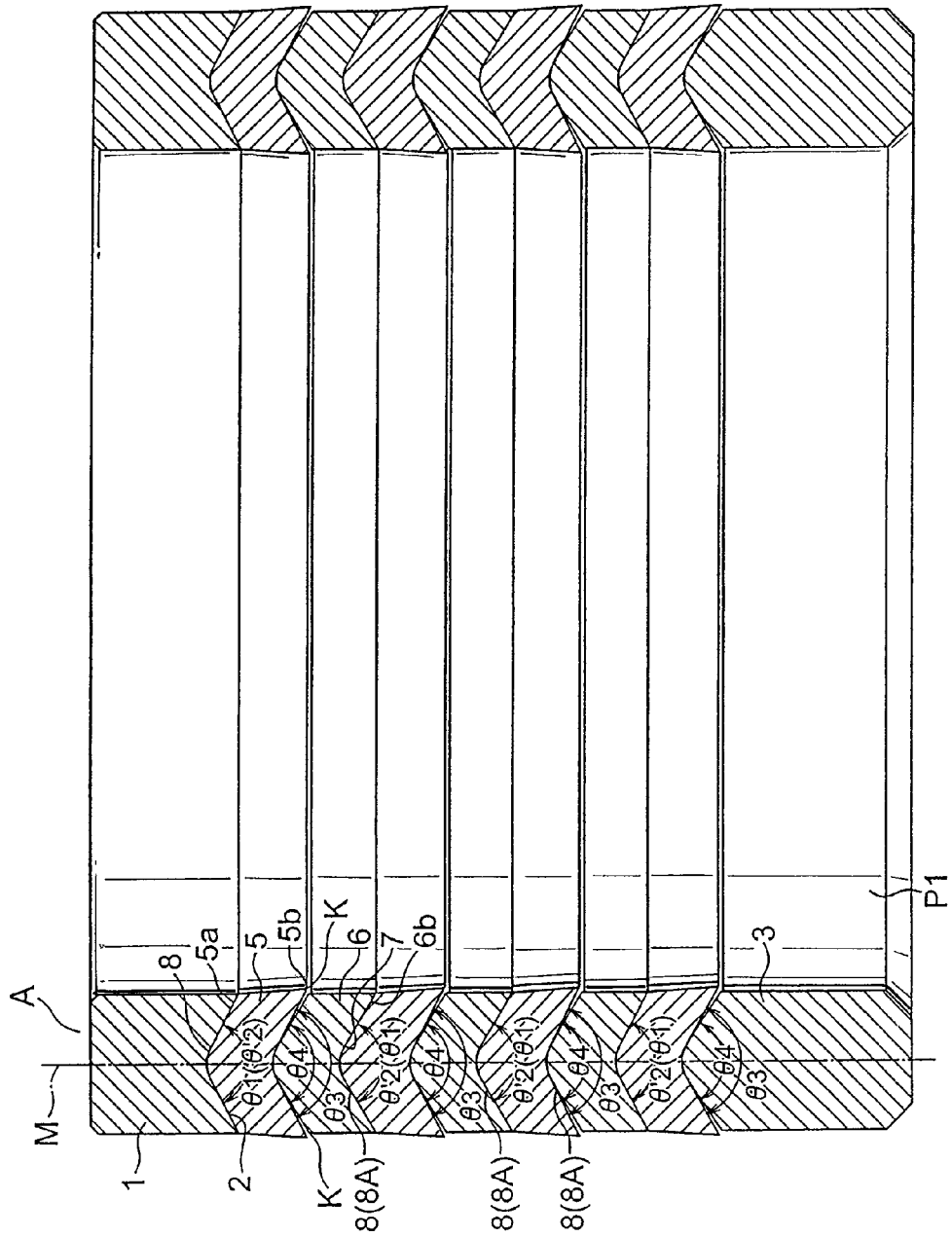
FIG. 6 is a sectional view showing a second embodiment of the present invention when the compaction force is released.
Figure 7:
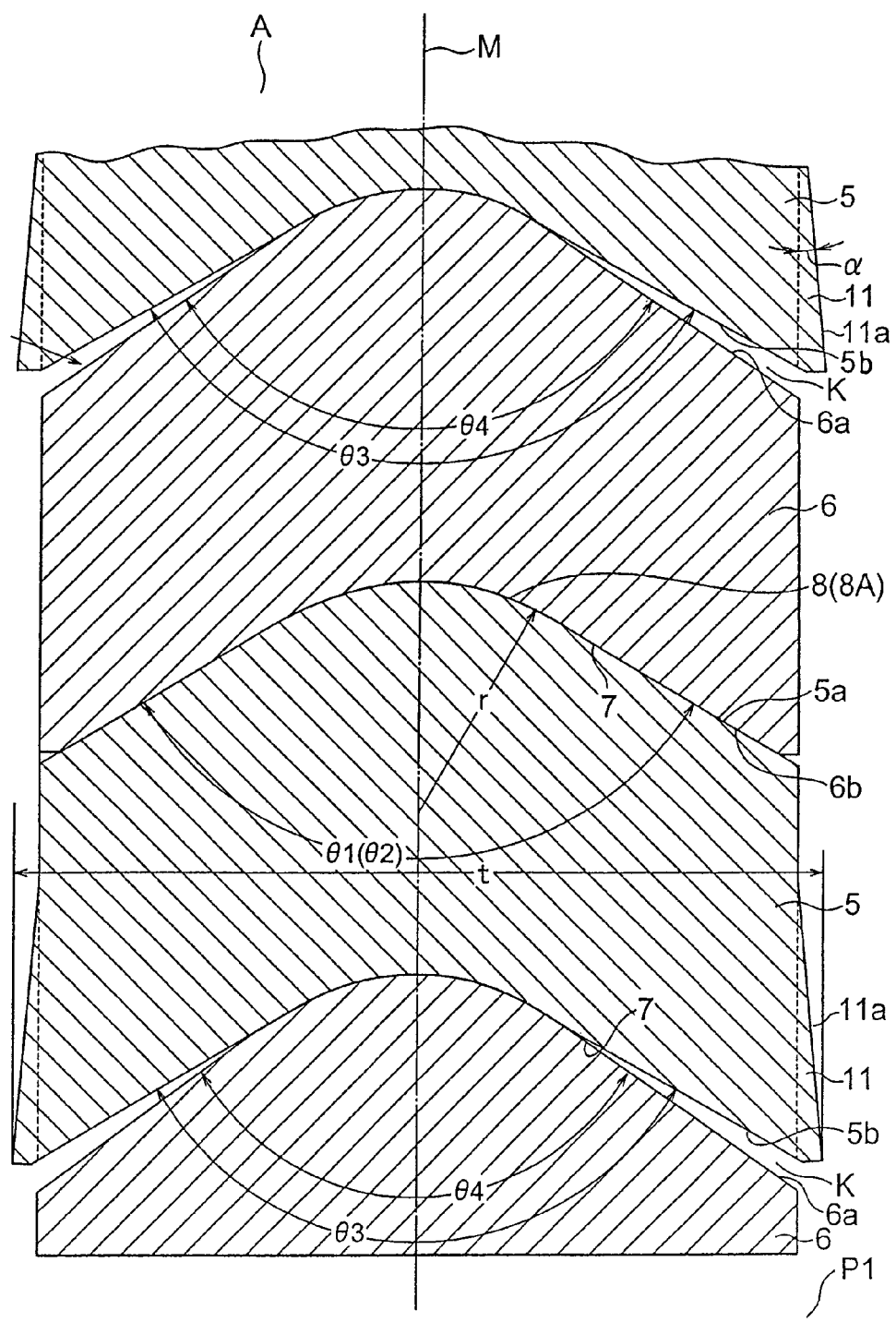
FIG. 7 is an enlarged sectional view showing a part of the high pressure sealing force.
Figure 8:
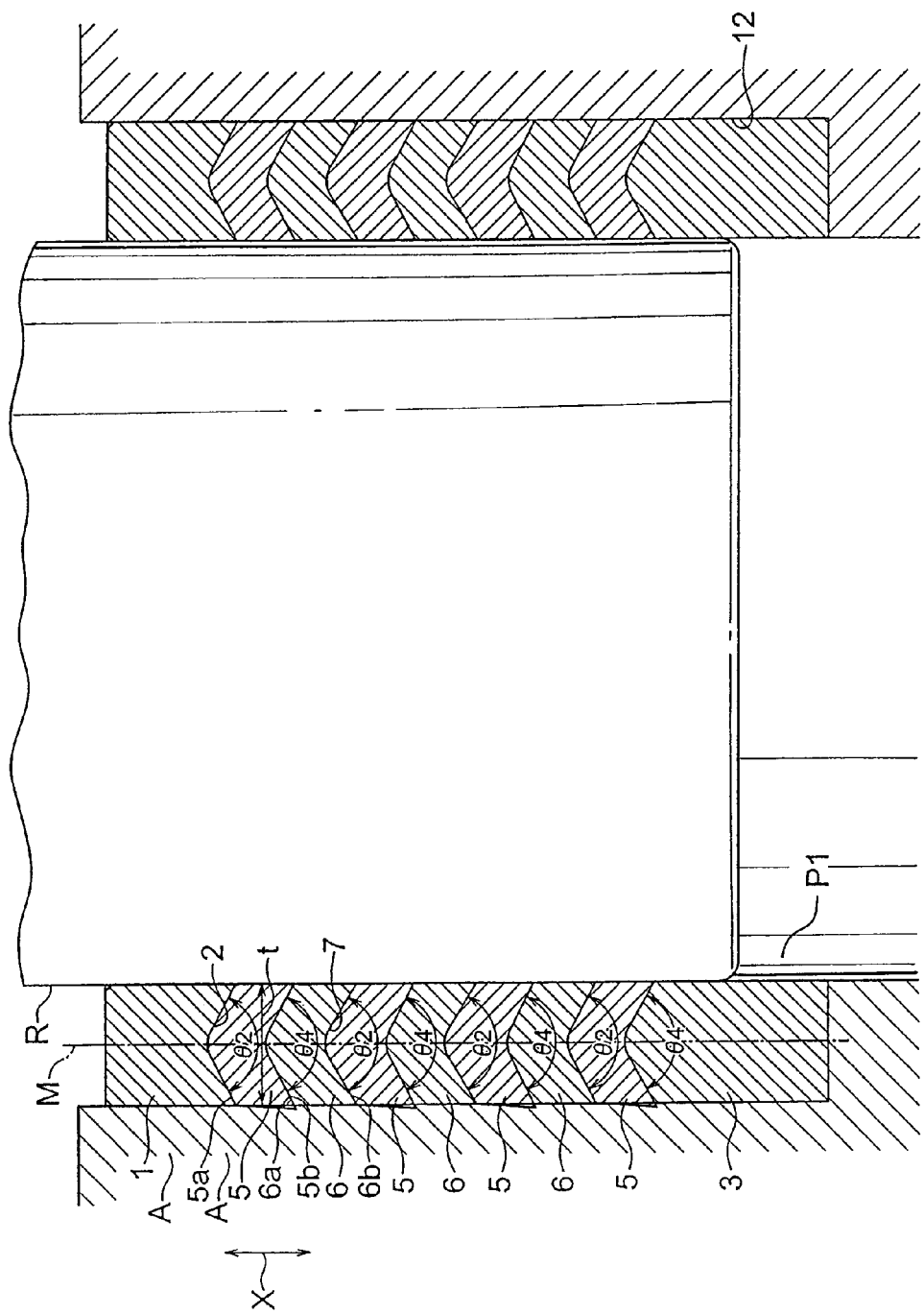
FIG. 8 is a sectional view showing the high pressure sealing apparatus when loading the high pressure sealing apparatus with the compaction force.
Figure 9:
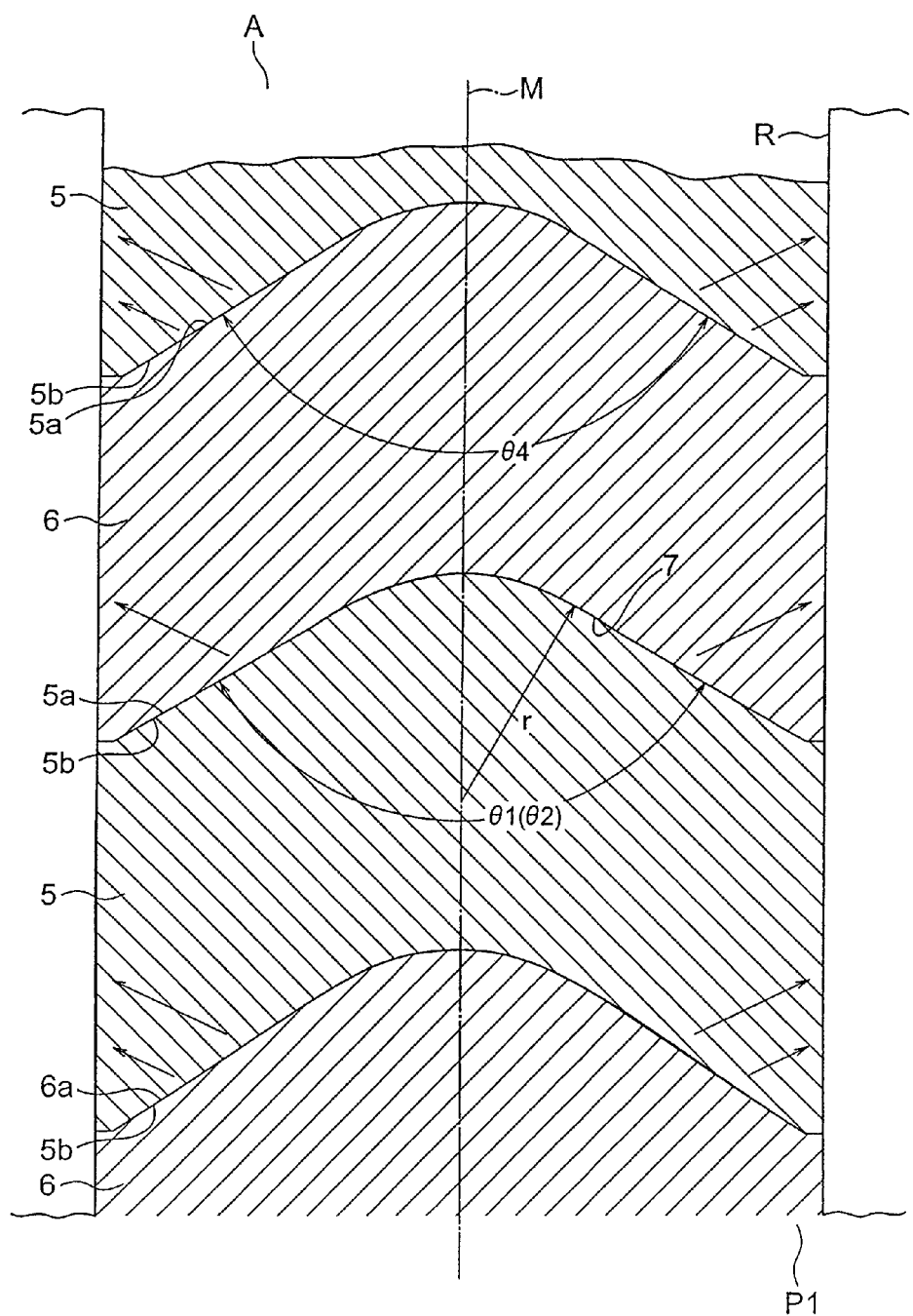
FIG. 9 is an enlarged sectional view showing a part of the high pressure sealing force.
Figure 10:
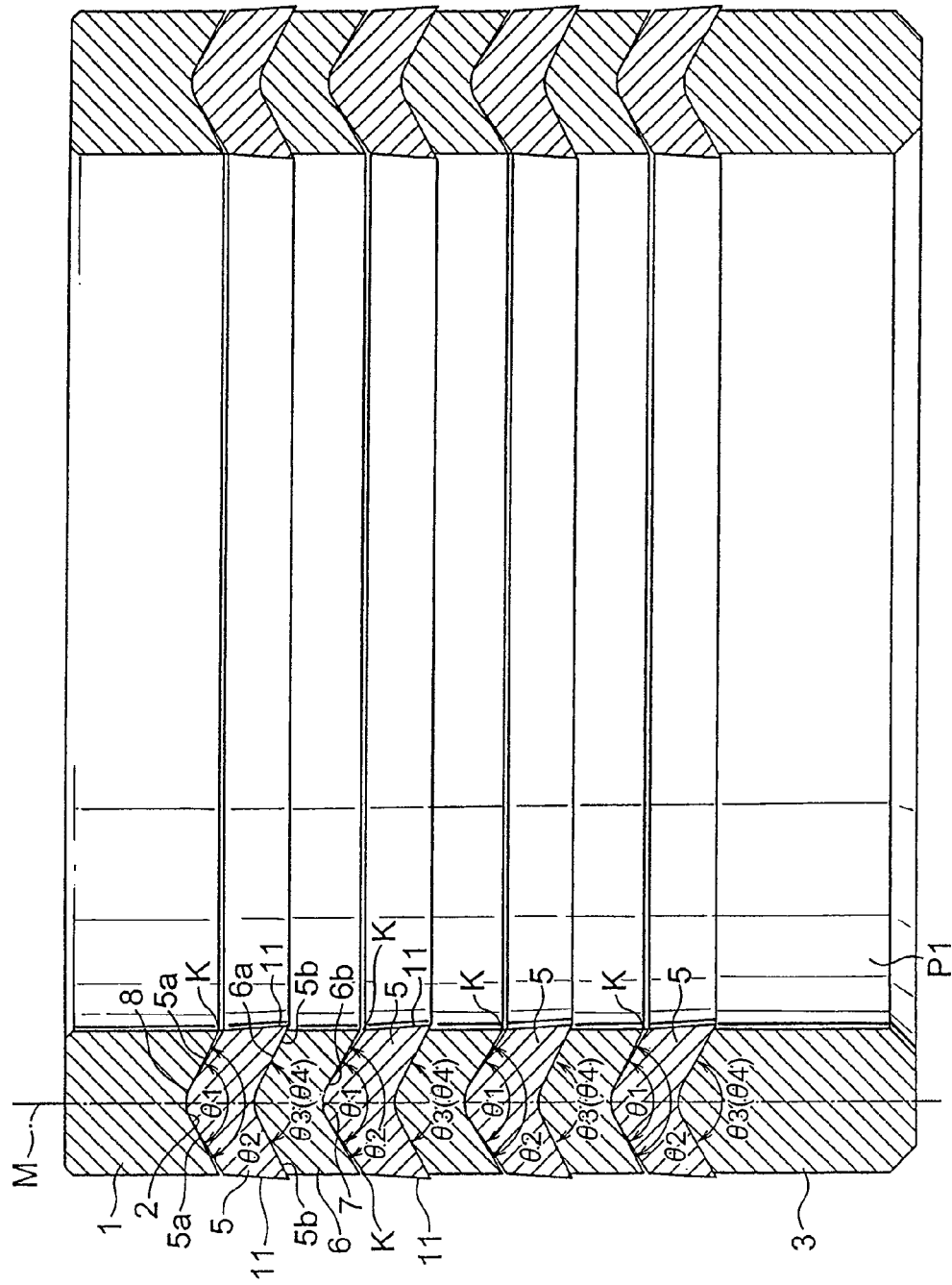
FIG. 10 is a sectional view showing a third embodiment of the present invention when the compaction force is released.
Figure 11:
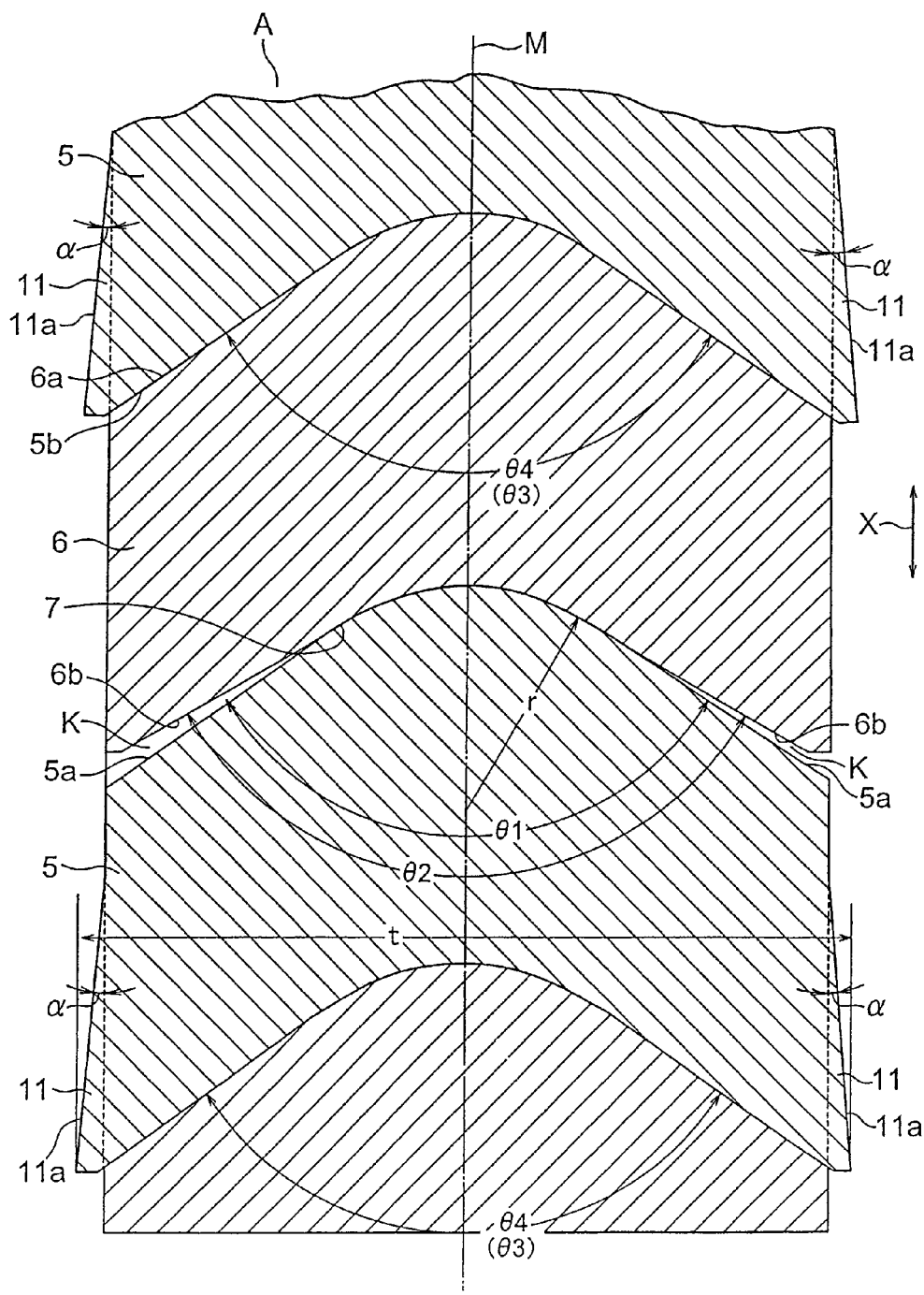
FIG. 11 is an enlarged sectional view showing a part of the high pressure sealing force.
Figure 12:
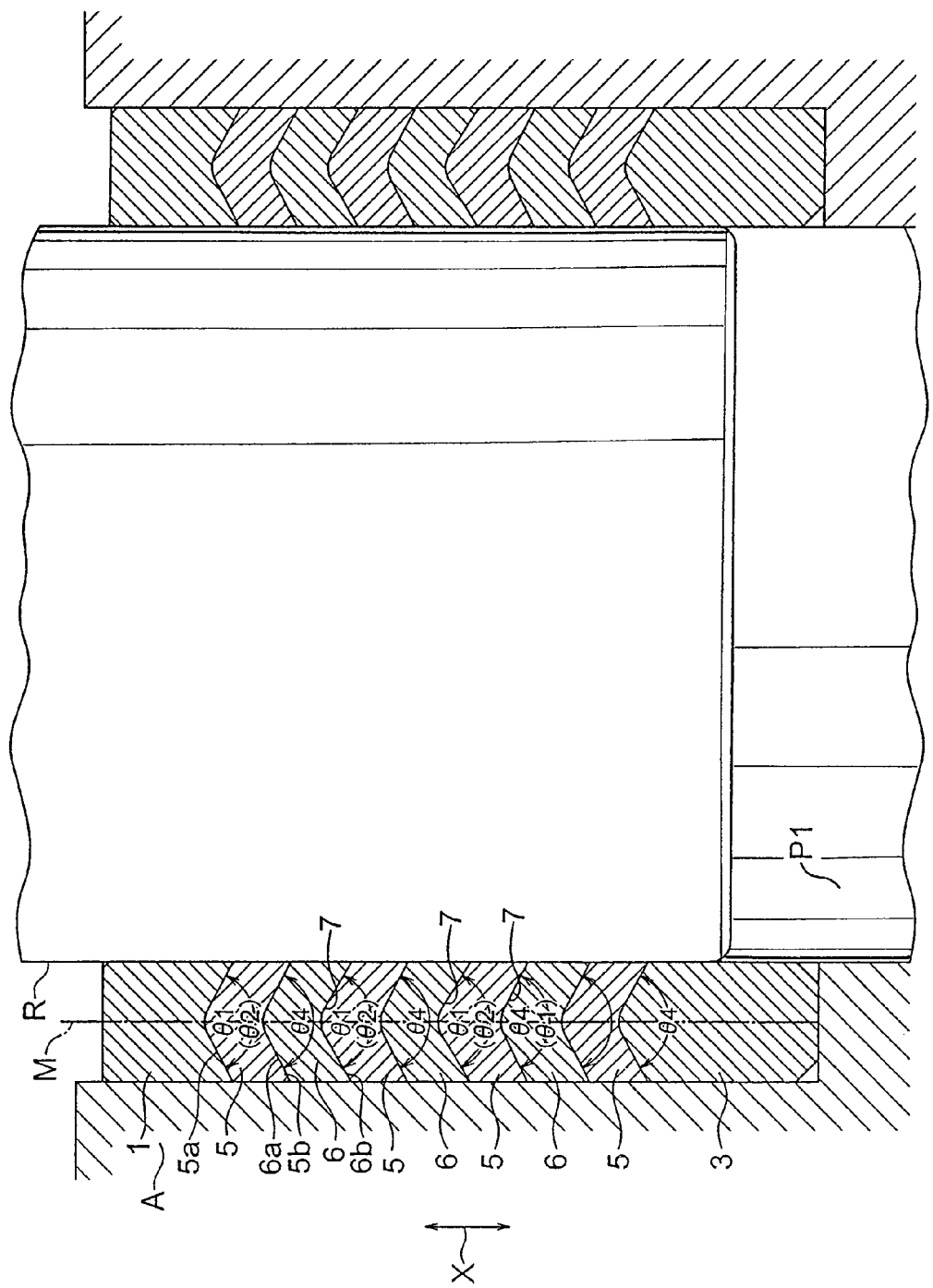
FIG. 12 is a sectional view showing the high pressure sealing apparatus when loading the high pressure sealing apparatus with the compaction force.
Figure 13:
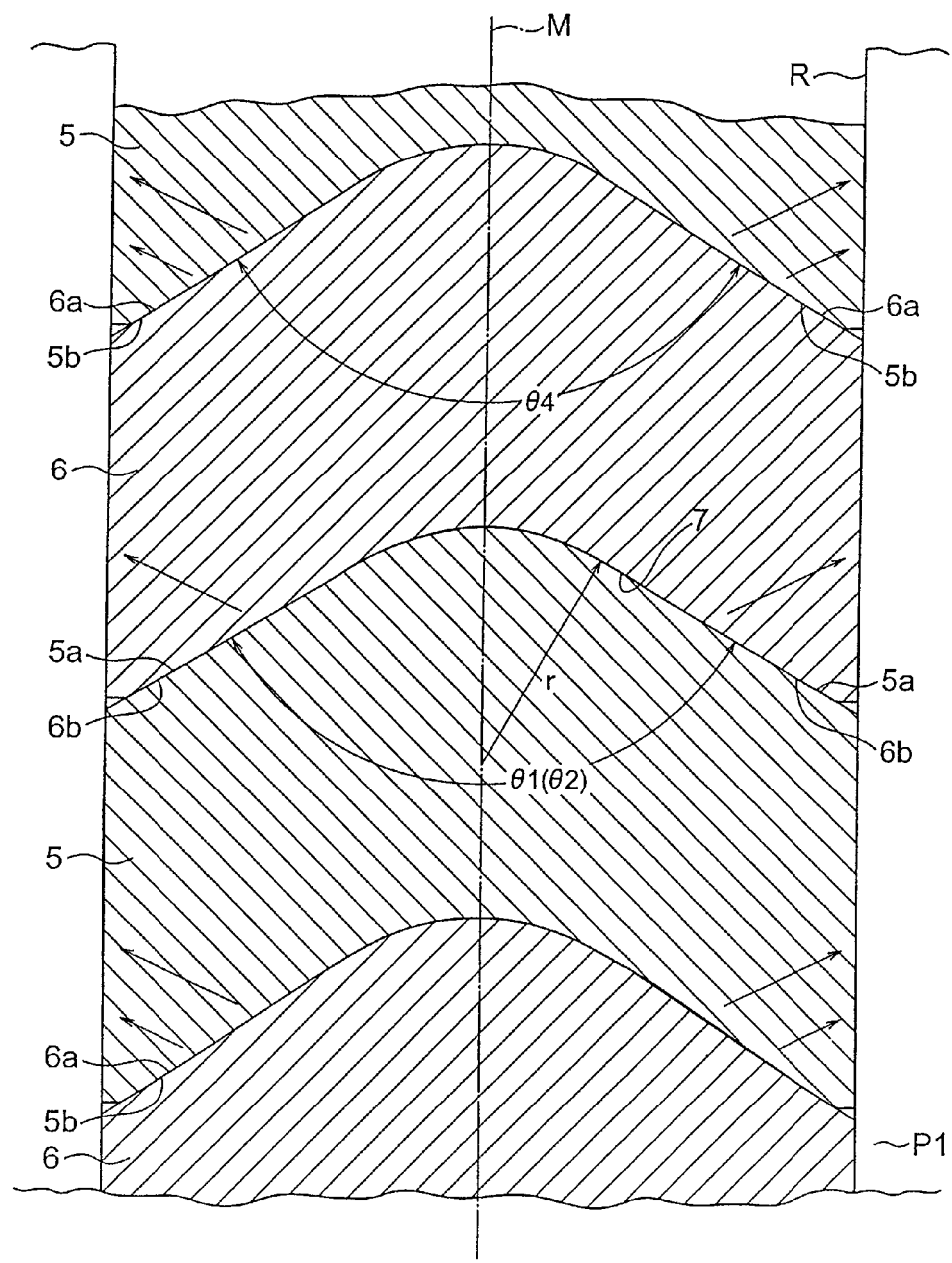
FIG. 13 is an enlarged sectional view showing a part of the high pressure sealing force.

Then, the plunger or the rod R is inserted from the top of the cover F into the packing assembly received in the packing receiving recess 12. Then, in addition to the tightening force of the tightening bolts 10, the compaction force owing to the insertion of the plunger or the rod R in the axial direction X deforms the packing members 5 in the axial direction 5. Therefore, as shown in FIG. 5, each deformation allowing gap K is closed. At this time, the volume of the packing member 5 is reduced by closing the deformation allowing gap K. Therefore, the packing member 5 is induced to be smoothly, rapidly, and easily deformed in the axial direction, the radial direction perpendicular to the axial direction, and the circumferential direction while the excessive deformation is prevented. Therefore, the packing member 5 closely contacts the plunger or the rod R with the proper contacting force to have a good sealing ability and prevent leak. Further, because the following ability of the packing member 5 to the plunger or the rod R reciprocatingly sliding in the axial direction X is increased, even under the high pressure when the target device B is operated, the excessive deformation over the stress limit and the elastic limit is prevented (see FIGS. 2 and 4). Thus, the plunger or the rod R reciprocatingly and liquid-tightly slides inside the top adapter 1, the packing members 5, the backup rings 6, and the bottom adapter 3 in the axial direction X.

At this time, the inclination angle θ1 at the top wall of the packing member 5 is smaller than the inclination angle θ2 of the packing receiving recess 2 formed on the bottom wall of the top adapter 1, and the inclination angle θ2 of the packing receiving part 7 formed at the bottom wall of the backup ring 6. Further, the inclination angle θ3 at the bottom wall of the packing member 5 is larger than the inclination angle θ4 at the top wall of the backup ring 6, and the inclination angle θ4 at the top wall of the bottom adapter 3. Further, the deformation allowing gap K formed at the top and bottom walls 5a, 5b of the packing member 5 becomes wider as the walls are extended from the contacting part 8 near the center bisector M. Therefore, when the compaction force of the tightening bolt 10 in the axial direction X closes the deformation allowing gaps K, the packing members 5 closely contact the bottom wall of the top adapter 1, the top and bottom walls of the backup rings 6, and the top wall of the bottom adapter 3. Because the packing members 5 closely contact with a previously reduced volume thereof owing to providing the deformation allowing gaps K, the excessive deformation over the stress limit and the elastic limit is prevented.

At this time, the noncontact parts 9 of the packing member 5 formed at both near and far sides of the plunger or the rod R are formed in a substantially triangular section and line-symmetric with respect to the center bisector M when the compaction force of the tightening bolt 10 is released. Therefore, owing to providing the noncontact part 9, the excessive deformation of the packing member 5 against the plunger or the rod R is prevented. Further, pressure deformation is induced both left and light direction equivalently with respect to the center bisector M. Because some of the packing members 5 receive the dispersed high pressure in the axial direction X, the packing members 5 closely contact the plunger or the rod R with the proper contacting force.

Further, because the deformation allowing gap K has a substantially triangular section and is line-symmetric with respect to the center bisector M, an assembly of the packing members 5 with respect to the bottom adapter 3, the backup rings 6, and the top adapter 1 is made with high accuracy without a deviation.

Further, the packing member 5 is made of relatively hard synthetic resin, namely, any one of polyamide resin, polyether ether ketone resin, polyethylene resin, polystyrene resin, or polyvinyl chloride resin. Further, the lip part 11 of the slope 11a having the inclination angle α such as five degree with respect to the center bisector M for decreasing the sectional area of the packing member 5 from the high pressure side to the low pressure side is formed on the side wall of the packing member 5 at least the plunger or the rod R side, so that the volume of the packing member 5 is reduced. Therefore, the packing member 5 is induced to be deformed while the excessive deformation over the stress and elastic limit is prevented, and the following ability of the packing member 5 against the reciprocatingly sliding plunger or the rod R is good. Because the packing member 5 closely contact with a proper contacting force, a good sealing ability is acquired, and the leak is surely prevented. Further, the abrasion of the packing member 5 with respect to the plunger or the rod R is reduced, the abrasion durability of the packing member 5 is increased. Thus, the packing member 5 has good abrasion durability with a small degradation, and generates little abrasion waste. Further, because the packing members 5 are protected by alternately overlapping with the backup rings 6 made of any one of phosphor bronze, stainless steel, aluminum bronze, nickel silver, or beryllium copper alloy, the packing members 5 keeps high strength even under high pressure and high temperature, and the mechanical life time thereof is increased. Therefore, a labor for exchanging the packing member 5 with new one, or cleaning abrasion waste is reduced, maintenance check becomes easy, the packing member 5 has good heat resistance, and thus, the sealing apparatus exerts high strength and has a long mechanical life time to ease maintenance check, and high heat resisting property, further, composed of the small number of parts, and has a simple structure to allow easy production and assembly.

Further, because the top adapter 1, the bottom adapter 3, and the backup ring 6 are made of any one of phosphor bronze, stainless steel, aluminum bronze, nickel silver, or beryllium copper alloy, the abrasion durability of the top adapter 1, the bottom adapter 3, and the backup ring 6 against the plunger or the rod R made of hard metal is good with little degradation, and the sealing apparatus exerts high strength and has a long mechanical life time, and has good heat resistance, good rust preventing ability, and good chemical resistance.

Thus, in the packing member 5 according to the first embodiment, the excessive deformation over the stress and elastic limits is prevented of course under pressure less than 100 MPa, and under more than 100 Mpa, preferably, under pressure over 280 MPa. The packing member 5 has good following ability against the plunger or the rod R, and closely contacts the plunger or the rod R with the proper contacting force. Therefore, the packing member 5 has good sealing ability and the leak is surely prevented. Further, the packing member 5 has good abrasion durability with little degradation, and exerts high strength. Therefore, the mechanical life time of the packing member 5 is more than several hundred hours in a continuous run, and the heat resistance of the packing member 5 is more than 120 degrees C. Thus, a high pressure sealing member having both good sealing ability under high pressure, and good abrasion durability and able to run for a long time is attained. Accordingly, the packing member 5 is used for a sealing apparatus against the sliding rod, piston, or plunger of the target device B, for example, a high pressure homogenizer for processing and segmentalizing material by dispersing, emulsifying or crushing the material included in a suspension liquid under high pressure, or for another example, a high-pressure pump. Applications of the packing member 5 are very wide.

Second Embodiment

A second embodiment of a high pressure sealing apparatus according to the present invention will be explained with reference to FIGS. 6 to 9.

In the second embodiment, the deformation allowing gap K is formed at the bottom wall 5b of the packing member 5. In the first embodiment, when the compaction force is released, the deformation allowing gaps K are formed at both the top wall 5a and the bottom wall 5b of the packing member 5. In the second embodiment, the inclination angle θ1 formed on the top wall 5a of the packing member 5 is substantially the same as the inclination angle θ'2 of the packing receiving recess 2 formed on the bottom wall of the top adapter 1 and the inclination angle θ'2 of the packing receiving part 7 formed on the bottom wall 6b of the backup ring 6. Further, the inclination angle θ3 formed on the bottom wall 5b of the packing member 5 is larger than the inclination angle θ4 of the top wall 6a of the backup ring 6 and the inclination angle θ4 of the top wall of the bottom adapter 3. The deformation allowing gap K formed at the bottom wall 5b of the packing member 5 becomes wider as the bottom wall 5b is extended from the contacting part 8 near the center bisector M.

Specifically, the inclination angles θ1, θ3 and the inclination angle θ'2 are 120 degrees, and the inclination angle θ4 is 115 degrees. However, these inclination angles are not limited to those according to the present invention.

Further, according to the second embodiment, when the compaction force in the axial direction X upon the installation on the target device B is smaller than that of the first embodiment, the deformation allowing gap K is closed so that the packing member 5 is deformed and closely contacts the backup ring 6 and the bottom adapter 3. Further, because the packing member 5 is supported by the metallic backup rings 6, even under high pressure, the excessive deformation over the stress and elastic limits of the packing member 5 is prevented, and the deformation of the packing member 5 is induced. Therefore, the following ability of the packing member 5 against the plunger or the rod R becomes good, and the packing member 5 closely contacts the rod R or the like with the proper contacting force. Therefore, the packing member 5 exerts the good sealing ability. Thus, the plunger or the rod R smoothly and surely slides. Further, because the backup ring 6 is made of any one of phosphor bronze, stainless steel, aluminum bronze, nickel silver, or beryllium copper alloy, the abrasion durability of the packing member 5 against the metallic plunger or the rod R is increased, and the heat generation owing to the abrasion is regulated.

Third Embodiment

FIGS. 10 to 13 show a third embodiment of the sealing apparatus according to the present invention.

In the third embodiment, different from the first embodiment, the deformation allowing gap K is formed on the top wall 5a of the packing member 5. Namely, in the third embodiment, the inclination angle θ1 formed on the top wall 5a of the packing member 5 is smaller than the inclination angle θ2 of the packing receiving recess 2 formed on the bottom wall of the top adapter 1 and the inclination angle θ2 of the packing receiving part 7 formed on the bottom wall 6b of the backup ring 6. Further, the inclination angle θ3 formed on the bottom wall 5b of the packing member 5 is substantially the same as the inclination angle θ4 of the top wall 6a of the backup ring 6 and the inclination angle θ4 of the top wall of the bottom adapter 3. The deformation allowing gap K formed at the top wall 5a of the packing member 5 becomes wider as the top wall 5a is extended from the contacting part 8 near the center bisector M.

According to the third embodiment, owing to the compaction force of the tightening bolt 10 in the axial direction X smaller than that of the first embodiment, the deformation allowing gap K is closed, and the top wall 5a of the packing member 5 closely contacts the packing receiving recess 2 formed on the bottom wall of the top adapter 1 and the bottom wall 6b of the backup ring 6. Because the packing member 5 is supported by the backup ring 6 made of any one of phosphor bronze, stainless steel, aluminum bronze, nickel silver, or beryllium copper alloy, the packing member 5 is induced to be deformed while the excessive deformation over the stress and elastic limit is prevented even under high pressure, and the following ability of the packing member 5 against the reciprocatingly sliding plunger or the rod R is good. Because the packing member 5 closely contact with a proper contacting force, a good sealing ability is acquired. Thus, the plunger or the rod R smoothly and surely slides. Further, because the backup ring 6 is made of any one of phosphor bronze, stainless steel, aluminum bronze, nickel silver, or beryllium copper alloy, the abrasion durability of the packing member 5 against the metallic plunger or the rod R is increased, and the heat generation owing to the abrasion is regulated.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A high pressure sealing apparatus comprising:
   a top adapter having a substantially circular shape in a plan view, and including a packing receiving recess having an inverted V-shaped section at a bottom wall of the top adapter the bottom wall having an apex defined by an inclination angle defining a packing receiving recess;
   a bottom adapter having a substantially circular shape in a plan view, and including a packing supporting wall having an inverted V-shaped section at a top wall of the bottom adapter the top wall having an apex defined by an inclination angle;
   a plurality of packing members each having a substantially circular shape in a plan view and an inverted V-shaped section, and interposed between the top adapter and the bottom adapter the packing members having a top wall with an apex defined by an inclination angle and a bottom wall having an apex defined by an inclination angle; and
   a plurality of metallic backup rings each having a substantially circular shape in a plan view and an inverted V-shaped section, including a packing receiving part at a bottom wall of the backup ring having an apex defined by an inclination angle defining a packing receiving part, and a top wall with an apex defined by an inclination angle, the backup rings and alternately overlapped with the packing members,
   wherein the packing members are made of hard synthetic resin, and
   wherein the inclination angle at the top wall of the packing member is smaller than the inclination angle of the packing receiving recess formed on the bottom wall of the top adapter, and the inclination angle of the packing receiving part formed at the bottom wall of the backup ring,
   wherein the inclination angle at the bottom wall of the packing member is the same as the inclination angle at the top wall of the backup ring, and the inclination angle at the top wall of the bottom adapter, and
   wherein deformation allowing gaps formed at the top walls of the packing members become wider as the walls are extended from the contacting apexes.

2. The high pressure sealing apparatus as claimed in claim 1,
   wherein a lip part having a slope of which sectional area is gradually decreased from the high pressure side to the low pressure side is formed on at least inner side wall of the packing member on which the plunger or the rod closely abuts.

3. The high pressure sealing apparatus as claimed in claim 1,
   wherein the inner and the outer side wall of the packing member is formed in a tapered shape with respect to the center bisector.

4. The high pressure sealing apparatus as claimed in claim 1,
   wherein the packing member is made of any one of polyamide resin, polyether ether ketone resin, polyethylene resin, polystyrene resin, or polyvinyl chloride resin.

5. The high pressure sealing apparatus as claimed in claim 1,
   wherein any one of the top adapter, the backup ring, or the bottom adapter is made of any one of phosphor bronze, stainless steel, aluminum bronze, nickel silver, or beryllium copper alloy.

6. A high pressure sealing apparatus providing a seal against high pressure fluid, comprising:
   a top adapter having a substantially circular shape in a plan view, and including a packing receiving recess having an inverted V-shaped section at a bottom wall of the top adapter, the bottom wall having an apex defined by an inclination angle defining a packing receiving recess;
   a bottom adapter having a substantially circular shape in a plan view, and including a packing supporting wall having an inverted V-shaped section at a top wall of the bottom adapter, the top wall having an apex defined by an inclination angle;
   a plurality of packing members each having a substantially circular shape in a plan view and an inverted V-shaped section, and interposed between the top adapter and the bottom adapter, the packing members having a top wall with an apex defined by an inclination angle and a bottom wall having an apex defined by an inclination angle; and
   a plurality of metallic backup rings each having a substantially circular shape in a plan view and an inverted V-shaped section, including a packing receiving part at a bottom wall of the backup ring having an apex defined by an inclination angle defining a packing receiving part, and a top wall with an apex defined by an inclination angle, the backup rings, alternately overlapped with the packing members,
   wherein the packing members are made of hard synthetic resin and when a compaction force is not applied to the sealing apparatus each apex of each packing member engages each apex of each adjacent backup ring and each apex of each adjacent adapter at a center bisector in a thickness direction of the packing members, and
   wherein a deformation allowing gap is formed at least between two facing walls of one of the packing members and an adjacent backup ring, and another deformation allowing gap is formed between two facing walls of one of the packing members and either the bottom wall of the top adapter or a top wall of the bottom adapter with each deformation allowing gap to be closed owing to a mechanical compaction force applied in an axial direction, which compaction force is independent of the fluid pressure acting on the packing members in use, and wherein before the compaction force is applied the deformation allowing gaps become wider as the walls are extended from contacting apexes near the center bisector and the deformation allowing gaps are formed on each side of the center bisector.

7. The apparatus as claimed in claim 6 wherein a deformation allowing gap is provided between each packing member and each adjacent backup ring and between both adapters and the packing member adjacent to each adapter.

8. The apparatus as claimed in claim 6 wherein a deformation allowing gap is provided between a top wall of each packing member and a bottom wall of each adjacent backup ring and between the bottom wall of the top adapter and the top wall of the packing member adjacent to the top adapter.

9. The apparatus as claimed in claim 6 wherein a deformation allowing gap is provided between a bottom wall of each packing member and a top wall of each adjacent backup ring and between the top wall of the bottom adapter and the bottom wall of the packing member adjacent to the bottom adapter.

* * * * *